US012809206B2

(12) United States Patent
Yuan et al.

(10) Patent No.: US 12,809,206 B2
(45) Date of Patent: Nov. 24, 2026

(54) DISPLAY SUBSTRATE AND DISPLAY DEVICE

(71) Applicants: Wuhan BOE Optoelectronics Technology Co., Ltd., Wuhan (CN); BOE Technology Group Co., Ltd., Beijing (CN)

(72) Inventors: Dongxu Yuan, Beijing (CN); Peng Jiang, Beijing (CN); Dalong Mao, Beijing (CN); Yun Li, Beijing (CN); Zihao Wang, Beijing (CN); Zhiheng Mo, Beijing (CN); Geng Li, Beijing (CN); Caixia Mao, Beijing (CN); Zhong Wan, Beijing (CN); Xinxin Zhao, Beijing (CN); Chuang Chen, Beijing (CN); Xiang Huang, Beijing (CN); Wenlei Xu, Beijing (CN)

(73) Assignees: Wuhan BOE Optoelectronics Technology Co., Ltd., Wuhan (CN); Beijing BOE Technology Development Co., Ltd., Beijing (CN)

( * ) Notice: Subject to any disclaimer, the term of this patent is extended or adjusted under 35 U.S.C. 154(b) by 263 days.

(21) Appl. No.: 18/709,797

(22) PCT Filed: Aug. 11, 2023

(86) PCT No.: PCT/CN2023/112538
§ 371 (c)(1),
(2) Date: May 13, 2024

(87) PCT Pub. No.: WO2025/035259
PCT Pub. Date: Feb. 20, 2025

(65) Prior Publication Data
US 2026/0161025 A1 Jun. 11, 2026

(51) Int. Cl.
*G02F 1/1335* (2006.01)
*G02F 1/1339* (2006.01)

(52) U.S. Cl.
CPC ...... *G02F 1/133512* (2013.01); *G02F 1/1339* (2013.01)

(58) Field of Classification Search
CPC .......................... G02F 1/133512; G02F 1/1339
See application file for complete search history.

(56) References Cited

U.S. PATENT DOCUMENTS

2003/0230748 A1 12/2003 Shih
2015/0077990 A1 3/2015 Park et al.
2021/0399262 A1* 12/2021 Woo .................... H10K 59/873

FOREIGN PATENT DOCUMENTS

CN 101071236 A 11/2007
CN 103926742 A 7/2014
(Continued)

OTHER PUBLICATIONS

PCT/CN2023/112538 international search report dated May 10, 2024.
PCT/CN2023/112538 Written Opinion dated May 10, 2024.

*Primary Examiner* — Anne M Hines
(74) *Attorney, Agent, or Firm* — IPro, PLLC

(57) ABSTRACT

Provided are a display substate and a display device. The display substrate includes a display region and a first peripheral region around at least one side of the display region; where the display substrate includes a first substrate and a second substrate that are oppositely disposed. The first substrate includes a first base and a driving circuit layer on a side of the substrate; wherein the second substrate includes a second base, a first light-shielding layer at a side of the second base and a second light-shielding layer at a side of the first light-shielding layer; where the first light-shielding layer includes a first light-shielding portion in the display
(Continued)

region and the first peripheral region, and the first light-shielding portion includes first openings; where the second light-shielding layer is in the first peripheral region, and the second light-shielding layer includes a second light-shielding portion. The display device includes the display substrate.

20 Claims, 6 Drawing Sheets

(56) References Cited

FOREIGN PATENT DOCUMENTS

| | | | |
|---|---|---|---|
| CN | 104102094 | A | 10/2014 |
| CN | 104423094 | A | 3/2015 |
| CN | 105093806 | A | 11/2015 |
| CN | 105607339 | A | 5/2016 |
| CN | 105892165 | A | 8/2016 |
| CN | 106226944 | A | 12/2016 |
| CN | 206096692 | U | 4/2017 |
| CN | 107589588 | A | 1/2018 |
| CN | 211043942 | U | 7/2020 |
| CN | 115202093 | A | 10/2022 |
| CN | 115236894 | A | 10/2022 |
| JP | 2003347556 | A | 12/2003 |

* cited by examiner

DISPLAY SUBSTRATE AND DISPLAY DEVICE

CROSS-REFERENCE TO RELATED APPLICATIONS

This application is a national stage of international PCT Application No. PCT/CN2023/112538 filed on Aug. 11, 2023, the entire contents of which are incorporated herein by reference.

TECHNICAL FIELD

The present disclosure relates to the technical field of display, and in particular, to a display substrate and a display device.

BACKGROUND

With the continuous development of display technology, display devices, such as mobile phones, laptops, TVs, etc., have become necessities in people's work and life. Liquid crystal display devices have become mainstream display devices due to their advantages, such as high brightness, bright colors, and wide viewing angles.

SUMMARY

Provided are a display substrate and a display device.

According to a first aspect of the embodiments of the present disclosure, a display substrate is provided. The display substrate includes a display region, a first peripheral region around at least one side of the display region; where the display substrate includes a first substrate and a second substrate that are oppositely disposed.

The first substrate includes a first base and a driving circuit layer on a side of the first base; where the second substrate includes a second base, a first light-shielding layer at a side of the second base and a second light-shielding layer at a side of the first light-shielding layer; where the first light-shielding layer includes a first light-shielding portion in the display region and the first peripheral region, and the first light-shielding portion includes first openings; where the second light-shielding layer is in the first peripheral region, and the second light-shielding layer includes a second light-shielding portion; where an orthographic projection of the second light-shielding portion on the first base overlaps an orthographic projection of the first light-shielding portion on the first base.

In an embodiment, the second light-shielding layer further includes a third light-shielding portion at a side of the second light-shielding portion and away from the display region, and the third light-shielding portion includes second openings; where a gap is between the second light-shielding portion and the third light-shielding portion.

In an embodiment, an orthogonal projection of the third light-shielding portion on the first base does not overlap an orthogonal projection of the first light-shielding layer on the first base.

In an embodiment, an edge of the third light-shielding portion away from the display region is flush with an edge of the first peripheral region away from the display region.

In an embodiment, the second light-shielding layer is closer to the first base than the first light-shielding layer, and the second light-shielding portion contacts the first light-shielding layer.

In an embodiment, an orthogonal projection of the third light-shielding portion on the first base partially overlaps an orthogonal projection of the first light-shielding portion on the first base and away from the display region.

In an embodiment, at a same side, an edge of the first light-shielding portion away from the display region is flush with an edge of the first base; where the display substrate further includes an insulating portion outside the first light-shielding portion.

In an embodiment, the second substrate further includes a first polarizer on a side of the second base and away from the first substrate, and the first substrate further includes a second polarizer at a side of the first base and away from the second substrate, where the insulating portion is between the first polarizer and the second polarizer.

In an embodiment, the second substrate further includes a first polarizer on a side of the second base and away from the first substrate, and the first substrate further includes a second polarizer at a side of the first base and away from the second base, where an orthographic projection of the third light-shielding portion on the first base is covered by an orthographic projection of the first polarizer on the first base, and is covered by an orthographic projection of the second polarizer on the first base.

In an embodiment, the first light-shielding portion contacts the second light-shielding portion; and a total transmittance of a portion of the first light-shielding portion without the first openings and a part of the second light-shielding portion in contact with the portion is less than a transmittance of a part of the second light-shielding portion corresponding to the first openings.

In an embodiment, the second substrate further includes a first polarizer on a side of the second base and away from the first substrate, and the first substrate further includes a second polarizer at a side of the first base and away from the second substrate, where an orthographic projection of the gap on the first base is covered by an orthographic projection of the first polarizer on the first base, and is covered by an orthographic projection of the second polarizer on the first base.

In an embodiment, the first substrate includes a liquid crystal layer; where the display substrate further includes sealant between the first substrate and the second substrate, the liquid crystal layer is surrounded by the sealant, and the sealant is in the first peripheral region; where an orthographic projection of the sealant on the first base overlaps the orthographic projection of the second light-shielding portion on the first base, and the orthographic projection of the sealant on the first base overlaps an orthographic projection of the third light-shielding portion on the first base.

In an embodiment, in a direction from the display region to the first peripheral region, a dimension of an overlap between the orthographic projection of the sealant on the first base and the orthographic projection of the second light-shielding portion on the first base is a first dimension, a dimension of an overlap between the orthographic projection of the sealant on the first base and the orthographic projection of the third light-shielding portion on the first base is a second dimension, and the first dimension is less than the second dimension.

In an embodiment, in a direction from the display region to the first peripheral region, a dimension of the third light-shielding portion is larger than a dimension of the second light-shielding portion.

In an embodiment, the first openings are the same as the second openings in shape and area.

In an embodiment, the display substrate further includes a second peripheral region adjacent to the first peripheral region, and the first light-shielding layer includes a fourth light-shielding portion in the second peripheral region, where the second light-shielding portion is in direct contact with the fourth light-shielding portion, an orthographic projection of the fourth light-shielding portion on the first base partially overlaps an orthographic projection of the second light-shielding portion on the first base, and a boundary is between a region where the second light-shielding portion and the fourth light-shielding portion contact and a region where the fourth light-shielding portion and the second light-shielding portion do not contact.

In an embodiment, a side of the first light-shielding portion in the first peripheral region away from the display region has a notch portion, and an orthographic projection of a part of an edge of the notch portion adjacent to the display region on the first base is covered by an orthographic projection of the second light-shielding portion on the first base.

In an embodiment, in a direction from the display region to the first peripheral region, a dimension of a part of the first light-shielding portion where the notch portion is provided tapers in a direction perpendicular to the direction from the display region to the first peripheral region.

In an embodiment, the first substrate includes a liquid crystal layer; the liquid crystal layer includes liquid crystal molecules; where the display substrate further includes sealant between the first substrate and the second substrate, the liquid crystal layer is surrounded by the sealant, and the sealant is in the first peripheral region; where at least part of the liquid crystal molecules in the first peripheral region of the liquid crystal layer contact the sealant; where orthographic projections of at least part of the liquid crystal molecules on the first base are covered by the orthographic projection of the second light-shielding portion on the first base In an embodiment, a part of the first light-shielding portion in the first peripheral region includes a first light-shielding sub-portion and a second light-shielding sub-portion between the first light-shielding sub-portion and the display region, and the display substrate further includes rows of first sub-pixels in the first peripheral region; where an orthographic projection of one of the first sub-pixels on the first base is within an orthographic projection of one of the first openings in the second light-shielding sub-portion on the first base; where at least one part of an orthographic projection of the second light-shielding sub-portion on the first base is outside the orthographic projection of the second light-shielding portion on the first base; where the first sub-pixels include liquid crystal molecules, and the long axis direction of each of the liquid crystal molecules of each of the first sub-pixels is perpendicular to a surface of the first base.

In an embodiment, an edge of the second light-shielding portion facing the display region overlaps an edge of the display region facing the first peripheral region.

In an embodiment, the second light-shielding portion is on a side of the second base and away from the first substrate, and the first light-shielding layer is closer to the first substrate than the second base; where a thickness of the second light-shielding portion is less than 1/10 of a thickness of the first light-shielding layer.

In an embodiment, the second base further includes a first polarizer on a side of the second light-shielding layer and away from the first base, and an orthographic projection of the second light-shielding portion on the first base is covered by an orthographic projection of the first polarizer on the first base.

In an embodiment, the driving circuit layer includes a target signal line, and the target signal line is the same as the second light-shielding layer in shape and area.

According to a second aspect of the embodiments of the present disclosure, a display device is provided, and the display device includes the above-mentioned display substrate.

According to the display substrate and the display device provided by the embodiments of the present disclosure, because that the second substrate includes a first light-shielding layer and a second light-shielding layer, and the orthographic projection of the second light-shielding portion of the second light-shielding layer on the first base overlaps the orthographic projection of the first light-shielding portion of the first light-shielding layer on the first base, the light emitted by the backlight source may be absorbed by the second light-shielding layer when the light passes through the opposite portion of the first light-shielding portion and the second light-shielding portion and enters the second light-shielding layer, so that the problem of bright lines in the first peripheral region of the display substrate is improved, thereby improving the user experience.

DETAILED DESCRIPTION

Figure 1:
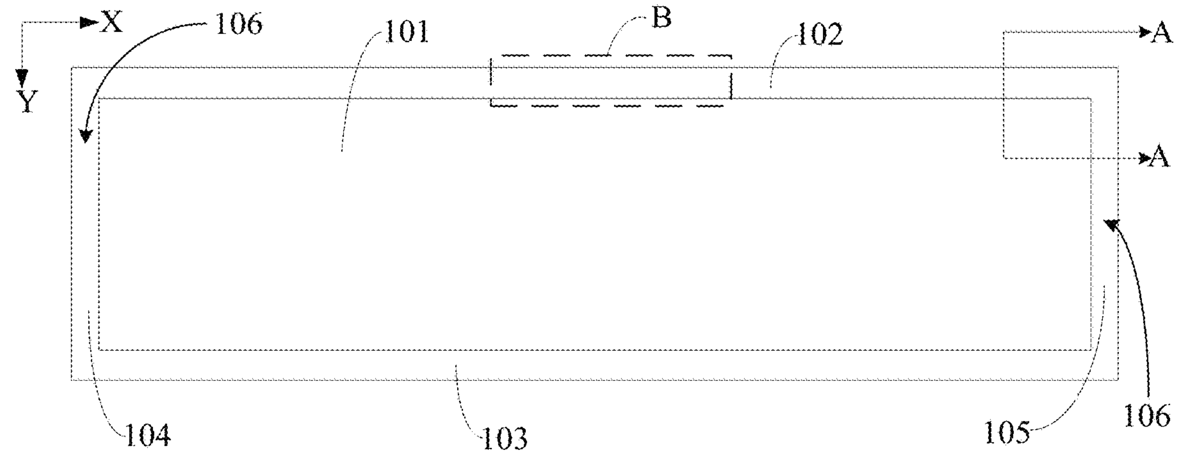
FIG. 1 is a top view of a display substrate according to an exemplary embodiment of the present disclosure.

Exemplary embodiments will be described in detail herein, examples of which are illustrated in the accompanying drawings. When the following descriptions involve the drawings, like numerals in different drawings refer to like or similar elements unless otherwise indicated. Embodiments described in the illustrative examples below are not intended to represent all embodiments consistent with the present disclosure. Rather, they are merely embodiments of devices and methods consistent with some aspects of the present disclosure as recited in the appended claims.

Terms used in the present disclosure is only for the purpose of describing particular embodiments and is not intended to limit the present disclosure. As used in the present disclosure and the appended claims, the singular forms “a”, “said” and “the” are intended to include the plural” and “the” are intended to include the plural forms as well, unless the context clearly dictates otherwise. It should also be understood that the term “and/or” as used herein refers to and includes any or all possible combinations of one or more associated listed items.

It should be understood that although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word “if” as used herein can be interpreted as “upon”, “when” or “in response to determining”.

In the process of manufacturing a display substrate, in order to reduce the manufacturing cost, a mask for a large-dimension substrate may be used to manufacture a mask for a small-dimension substrate. For example, the length ratio of a long side to a short side of the large-dimension substrate may be 16:9, and the length ratio of a long side to a short side of the small-dimension substrate may be 32:9. In the process of manufacturing a small-dimension substrate, a baffle may be used to block a part of the mask for the large-dimension substrate. However, the movement of the baffle is limited, resulting in that a part of the peripheral region of the manufactured display substrate cannot be covered by a light-shielding layer, so that a peripheral region of the display substrate appears to be bright.

Embodiments of the present disclosure provide a display substrate and a display device, which can solve the above technical problems. The display substrate and the display device in the embodiments of the present disclosure will be described in detail below with reference to the accompanying drawings. Features in the embodiments described below may complement each other or be combined with each other without conflicts.

According to an embodiment of the present disclosure, a display substrate is provided. As shown in FIG. 1, the display substrate includes a display region 101 and a first peripheral region 102 around at least one side of the display region 101.

Figure 2:
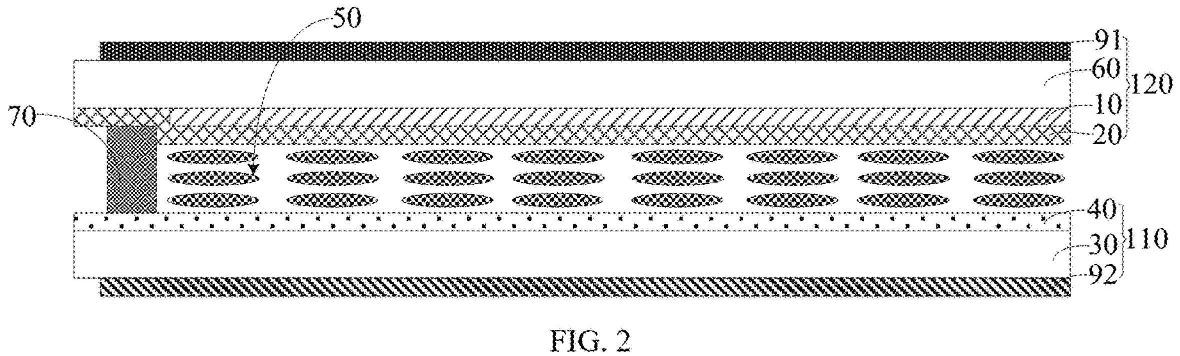
FIG. 2 is a cross-sectional view of the display substrate shown in FIG. 1 taken along a line AA.
Figure 3:
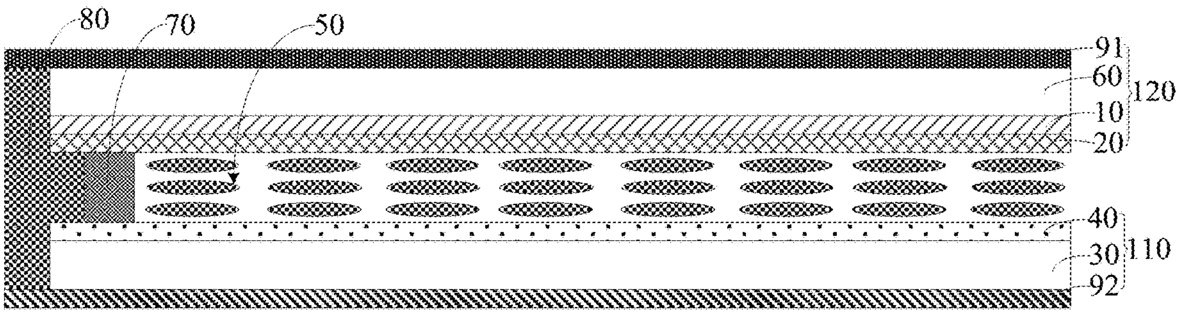
FIG. 3 is another cross-sectional view of the display substrate shown in FIG. 1 taken along the line AA.
Figure 4:
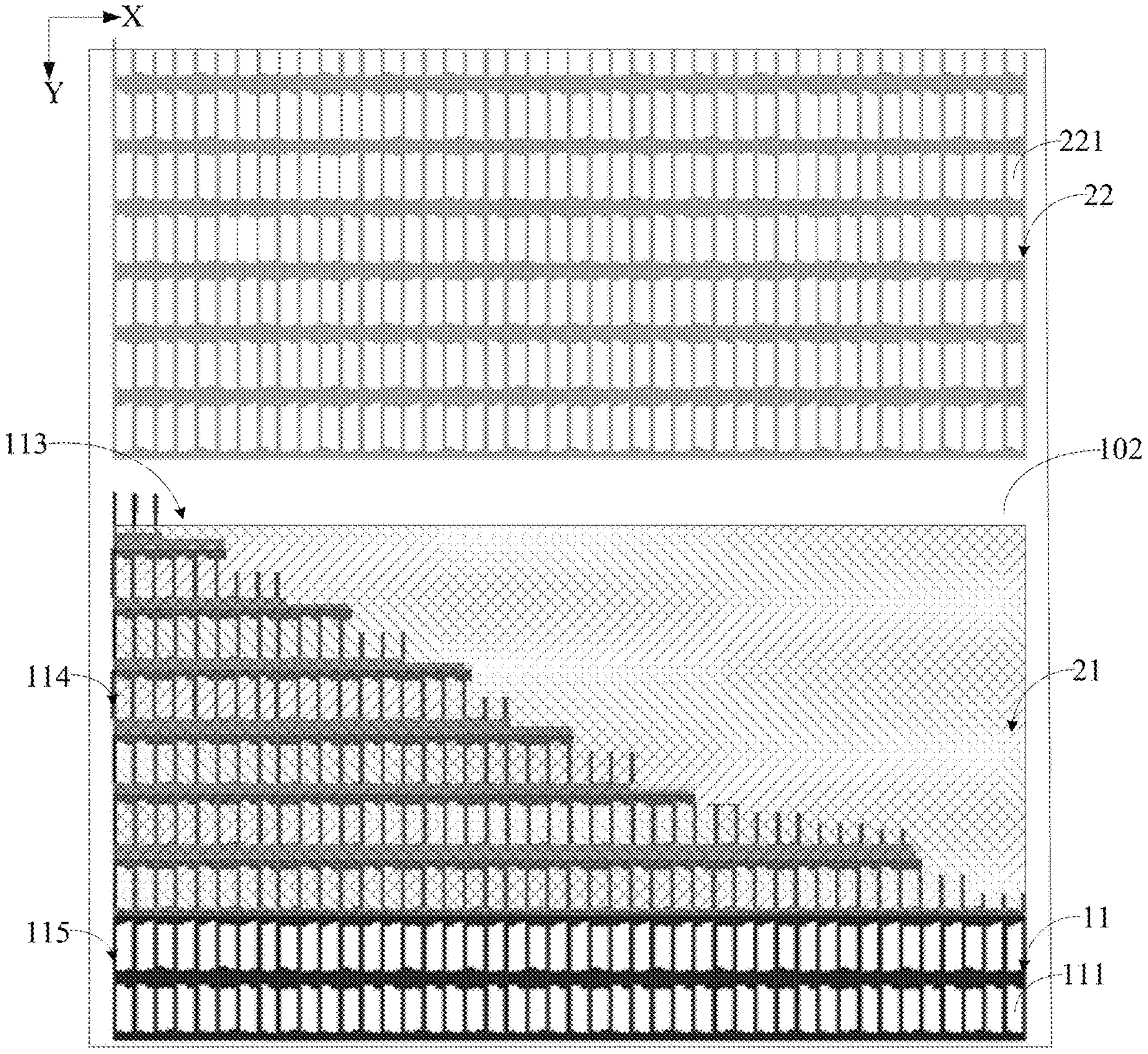
FIG. 4 is a partial schematic structure diagram of a first peripheral region of a display substrate according to an embodiment of the present disclosure.
Figure 5:
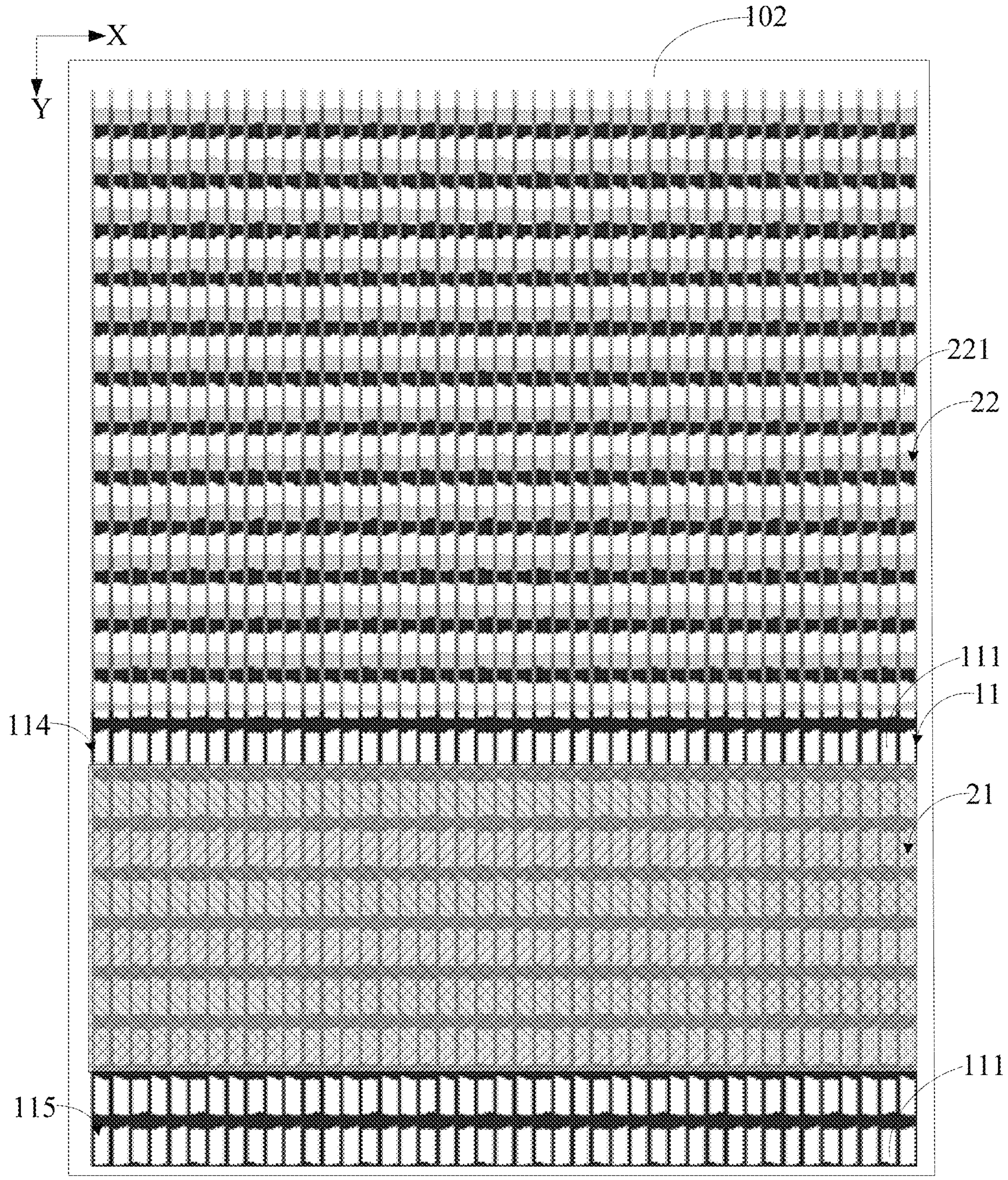
FIG. 5 is a partial schematic structure diagram of a first peripheral region of a display substrate according to another embodiment of the present disclosure.

As shown in FIGS. 2 and 3, the display substrate includes a first substrate 110 and a second substrate 120 that are oppositely disposed. The first substrate 110 includes a first base 30 and a driving circuit layer 40 on a side of the first base 30 facing the second substrate 120. The second substrate 120 includes a second base 60, a first light-shielding layer 10 at a side of the second base 60, and a second light-shielding layer 20 at a side of the first light-shielding layer 10. As shown in FIGS. 4 and 5, the first light-shielding layer 10 includes a first light-shielding portion 11 in the display region 101 and the first peripheral region 102. The first light-shielding portion 11 includes first openings 111. The second light-shielding layer 20 is in the first peripheral region 102, and the second light-shielding layer 20 includes a second light-shielding portion 21. A gap is between the second light-shielding portion 21 and a third light-shielding portion 22. An orthographic projection of the second light-shielding portion 21 on the first base 30 overlaps an orthographic projection of the first light-shielding portion 11 on the first base 30. The second light-shielding portion 21 is not provided with openings, that is, the second light-shielding portion 21 is a continuous layer.

According to the display substrate provided by the embodiments of the present disclosure, because that the second substrate includes a first light-shielding layer and a second light-shielding layer, and the orthographic projection of the second light-shielding portion of the second light-shielding layer on the first base overlaps the orthographic projection of the first light-shielding portion of the first light-shielding layer on the first base, the light emitted by the backlight source may be absorbed by the second light-shielding layer when the light passes through the opposite portion of the first light-shielding portion and the second light-shielding portion and enters the second light-shielding layer, so that the problem of bright lines in the first peripheral region of the display substrate is alleviated, thereby improving the user experience.

In the display substrate provided by the embodiment of the present disclosure, the first light-shielding layer and the second light-shielding layer may be manufactured by using a mask of a display substrate that is larger than the dimension of the display substrate. The first light-shielding portion and the second light-shielding portion are manufactured by different regions of the mask.

In an embodiment, as shown in FIG. 1, the display substrate further includes a second peripheral region 106 adjacent to the first peripheral region 102. The second peripheral region 106 includes a first peripheral sub-region 104 and a second peripheral sub-region 105. The first peripheral sub-region 104 and the second peripheral sub-region 105 are oppositely disposed and are at opposite sides of the display region 101. The display substrate further includes a third peripheral region 103 opposite to the first peripheral region 102. The first peripheral region 102 and the third peripheral region 103 extend along a first direction X, the first peripheral sub-region 104 and the second peripheral sub-region 105 extend along the second direction Y, and the first direction X and the second direction Y may be perpendicular to each other. The third peripheral region 103 may be provided with fan-out circuit(s), flexible circuit board(s), etc., and the first peripheral sub-region 104 and the second peripheral sub-region 105 may be provided with gate drive circuit(s). In some embodiments, the first direction X may be a row direction, and the second direction Y may be a column direction.

In an embodiment, as shown in FIG. 1, the dimension of the display substrate in the first direction X is larger than the dimension of the display substrate in the second direction Y.

In an embodiment, as shown in FIGS. 2 and 3, the display substrate includes a liquid crystal layer 50, and the liquid crystal layer 50 is between the first substrate 110 and the second substrate 120. The display substrate further includes a first electrode (not shown) and a second electrode (not shown). The display substrate may include sub-pixels, and the sub-pixels may include first sub-pixels in the first peripheral region and second sub-pixels in the display region. Each sub-pixel includes a first electrode, a second electrode and liquid crystal molecules. One of the first electrode and the second electrode is a pixel electrode, and the other one of the first electrode and the second electrode is a common electrode. Each first opening 111 of the first light-shielding layer 10 may respectively correspond to a pixel electrode. In a stacking direction of layers of the display substrate, the first opening 111 is opposite to the corresponding pixel electrode and opposite to a part of the common electrode.

In an embodiment, the driving circuit layer 40 includes pixel circuits. The pixel circuits and the sub-pixels may correspond with each other one-to-one, and for each pixel circuit, the pixel circuit drives a sub-pixel corresponding to the pixel circuit.

In an embodiment, as shown in FIGS. 2 and 3, the first light-shielding layer 10 is closer to the first substrate 110 than the second base 60, and the second light-shielding layer 20 is closer to the first substrate 110 than the first light-shielding layer 10. The second substrate 120 further includes a color filter layer, and the color filter layer is at a side of the second light-shielding layer 20 and away from the second base 60. The color filter layer includes color filter portions, and for each color filter portion, the orthographic projection of the color filter portion on the second base 60 is within an orthographic projection of a first opening 111 on the second base 60.

In an embodiment, as shown in FIGS. 2 and 3, the display substrate further includes a sealant 70. The sealant 70 is between the first substrate 110 and the second substrate 120. The sealant 70 is in the first peripheral region 102, and the sealant 70 surrounds the liquid crystal layer 50.

In an embodiment, as shown in FIGS. 2 and 3, the second substrate 120 further includes a first polarizer 91 on a side of the second base 60 and away from the first substrate 110. The first substrate 110 further includes a second polarizer 92 at a side of the first base 30 and away from the second substrate 120.

In an embodiment, as shown in FIGS. 4 and 5, the second light-shielding layer 20 further includes a third light-shielding portion 22 at a side of the second light-shielding portion 21 and away from the display region 101. The third light-shielding portions 22 are provided with second openings 221.

In an embodiment, the first opening 111 of the first light-shielding portion 11 is the same as the second opening 221 of the third light-shielding portion 22 in shape and area.

In an embodiment, as shown in FIGS. 4 and 5, in the direction from the display region 101 to the first peripheral region 102, that is, in the second direction Y, a dimension of the third light-shielding portion 22 is larger than a dimension of the second light-shielding portion 21.

In an embodiment, in the second direction Y, the dimension of the third light-shielding portion 22 may be 2.6 mm, the dimension of the second light-shielding portion 21 may be 2.3 mm, and a dimension of the gap between the second light-shielding portion 21 and the third light-shielding portion 22 may be 0.4 mm.

In an embodiment, the second light-shielding portion 21 contacts the first light-shielding layer 10. In the process of manufacturing the first light-shielding layer 10 and the second light-shielding portion 21, the first light-shielding layer 10 and the second light-shielding portion 21 may be formed by coating the light-shielding material and performing twice exposure for the light-shielding material. When the light-shielding material is a negative photoresist, the first light-shielding layer 10 is formed by performing the first exposure, and the second light-shielding portion 21 is formed by performing the second exposure.

In an embodiment, as shown in FIG. 4, the orthographic projection of the third light-shielding portion 22 on the first base 30 does not overlap the orthogonal projection of the first light-shielding layer 10 on the first base 30. With such an arrangement, even if the third light-shielding portion 22 is charged caused by ions in the air, static electricity generated at the edge of the display substrate, etc., the third light-shielding portion 22 cannot transmit the charge to the first light-shielding portion 11, thereby avoiding the picture displayed in the display region of the display substrate to be green caused by the charged first light-shielding portion 11, which helps to improve the user experience.

Further, as shown in FIG. 4, an edge of the third light-shielding portion 22 away from the display region 101 is flush with an edge of the first peripheral region 102 away from the display region 101. With this arrangement, when manufacturing the third light-shielding portion 22, the manufacturing precision of the third light-shielding portion 22 is lower.

In another embodiment, as shown in FIG. 5, the orthographic projection of the third light-shielding portion 22 on the first base 30 overlaps the orthographic projection of a part of the first light-shielding portion 11 away from the display region 101 on the first base 30.

Further, as shown in FIG. 5, an edge of the first light-shielding portion 11 away from the display region 101 is flush with an edge of the first base 30 which is located in a same side as the edge of the first light-shielding portion 11 away from the display region 101. The display substrate further includes an insulating portion 80 at the outer side the first light-shielding portion 11. The outer side of the first light-shielding portion 11 refers to the side of the first light-shielding portion 11 away from the display region 101. By disposing the insulating portion 80, that the third light-shielding portion 22 is charged caused by static electricity, ions in the air, etc. in contact with the third light-shielding portion 22 may be avoided, thereby avoiding the picture displayed in the display region of the display substrate from to be green caused by the charged first light-shielding portion 11. In this embodiment, the first light-shielding portion 11 may extend to a region near the edge of the first peripheral region 102 away from the display region 101. In this embodiment, the third light-shielding portion 22 contacts the first light-shielding portion 11.

Further, as shown in FIG. 3, the insulating portion 80 is between the first polarizer 91 and the second polarizer 92. An edge of the insulating portion 80 away from the display region 101 may be flush with the edge of the first peripheral region 102 away from the display region 101. Disposing the insulating portion 80 between the first polarizer 91 and the second polarizer 92 can fix the insulating portion 80 and prevent the insulating portion 80 from falling off from the display substrate. The transmission axis of the first polarizer 91 and the transmission axis of the second polarizer 92 can be set to be perpendicular to each other. In this way, the light emitted by the backlight source may be absorbed by the first polarizer 91 when the light passes through the second polarizer 92 and the insulating portion 80 and enters the first polarizer 91, which can prevent the first peripheral region 101 of the display substrate from being bright. In this embodiment, the edge of the first polarizer 91 away from the display region 101 may extend the second base 60, and the edge of the second polarizer 92 away from the display region 101 may extend beyond the first base 30.

In an embodiment, the edge of the orthographic projection of the first polarizer 91 on the first base 30, where the edge of the orthographic projection of the first polarizer 91 on the first base 30 is in the first peripheral region 102 and extends along the first direction X, is coincident with the edge of the orthographic projection of the second polarizer 92 on the first base 30, where the edge of the orthographic projection of the second polarizer 92 on the first base 30 is in the first peripheral region 102 and extends along the first direction X.

In an embodiment, the orthographic projection of the sealant 70 on the first base 30 is all within the orthographic projection of the first polarizer 91 on the first base 30, and the orthographic projection of the sealant 70 on the first base 30 is all within the orthographic projection of the second polarizer 92 on the first base 30. With this arrangement, a region of the first peripheral region 102 where the sealant 70 is disposed can be avoided from being bright.

Figure 6:
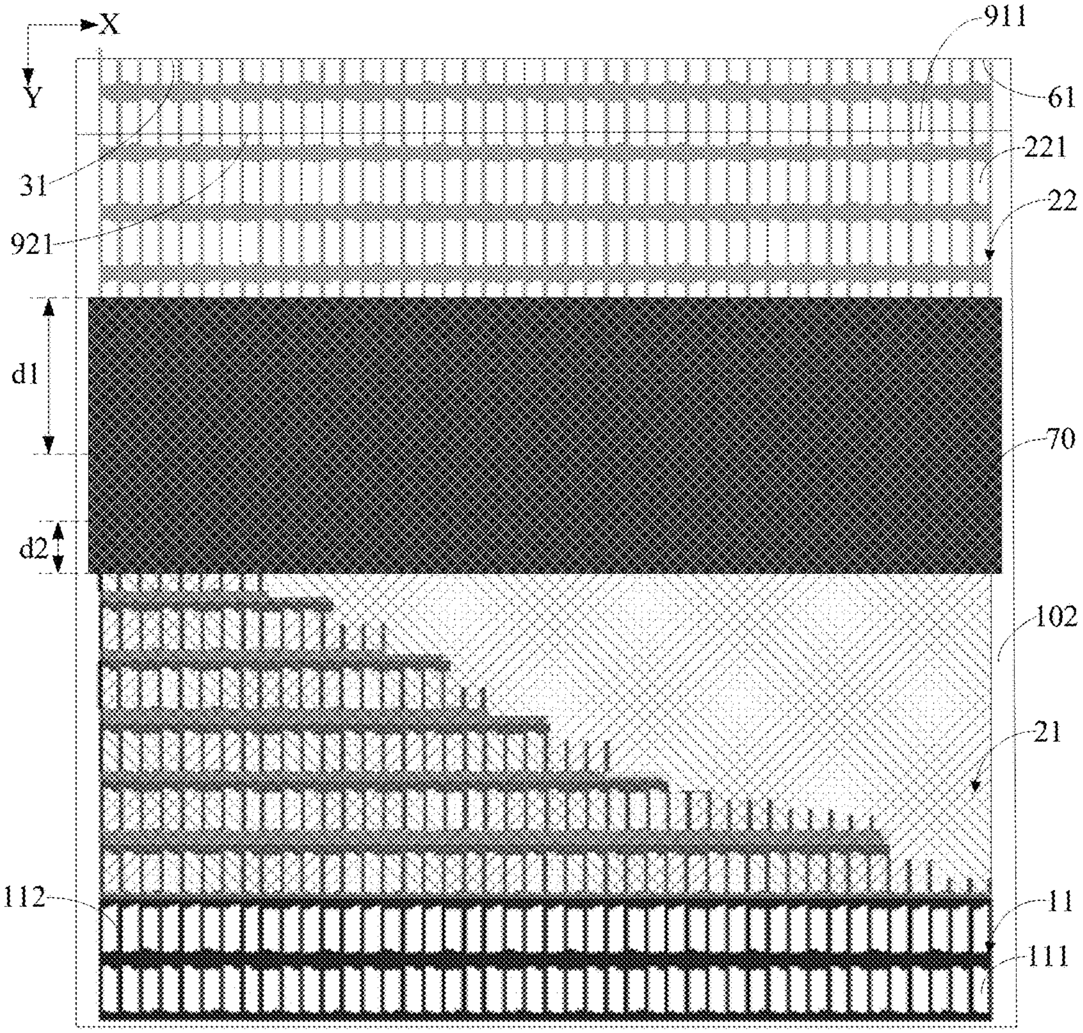
FIG. 6 is a partial schematic structure diagram of a first peripheral region of a display substrate according to another embodiment of the present disclosure.

In an embodiment, as shown in FIG. 6, the edge of the sealant 70 in the first peripheral region 102 and away from the display region 101 is at the inner side of the edge 911 of the first polarizer 91 away from the display region 101. The edge of the sealant 70 in the first peripheral region 102 and away from the display region 101 is at the inner side of the edge 921 of the second polarizer 92 away from the display region 101.

In an embodiment, as shown in FIG. 6, the edge 911 of the first polarizer 91 in the first peripheral region 102 and extending along the first direction X is at the inner side of the edge 61 of the second base 60, where the edge 911 and the edge 61 are located in a same side of the first peripheral region 102. The edge 921 of the second polarizer 92 are in the first peripheral region 102 and extending along the first direction X is at the inner side of the edge 31 of the first base 30, where the edge 921 and the edge 31 are located in a same side of the first peripheral region 102. For example, a distance between the edge 911 of the first polarizer 91 and the edge 61 of the second base 60 is 0.6 mm, and a distance between the edge 921 of the second polarizer 92 and the edge 31 of the first base 30 is 0.6 mm.

In an embodiment, no light from the backlight source is incident on the region of the first peripheral region 102 beyond the first polarizer 91, or the surface of the region of the first peripheral region 102 beyond the first polarizer 91 away from the second substrate 120 is covered by a housing of a display device including the display substrate. In this way, the region of the first peripheral region 102 extend beyond the first polarizer 91 may not be bright.

In an embodiment, as shown in FIG. 6, the first light-shielding portion 11 contacts the second light-shielding portion 21. The first light-shielding portion 11 includes a light-shielding portion 112 without the first openings 111, and a total transmittance of the light-shielding portion 112 of the first light-shielding portion 11 and a part of the second light-shielding portion 21 in contact with the light-shielding portion 112 is less than a transmittance of a part of the second light-shielding portion 21 corresponding to the first openings 111. In some embodiments, a total thickness of the light-shielding portion 112 of the first light-shielding portion 11 and the part of the second light-shielding portion 21 in contact with the light-shielding portion 112 is greater than a thickness of the part of the second light-shielding portion 21 corresponding to the first opening 111, so that a total transmittance of the light-shielding portion 112 of the first light-shielding 11 and a part of the second light-shielding portion 21 in contact with the light-shielding portion 112 is greater a transmittance of a part of the second light-shielding portion 21 corresponding to the first openings 111.

Figure 7:
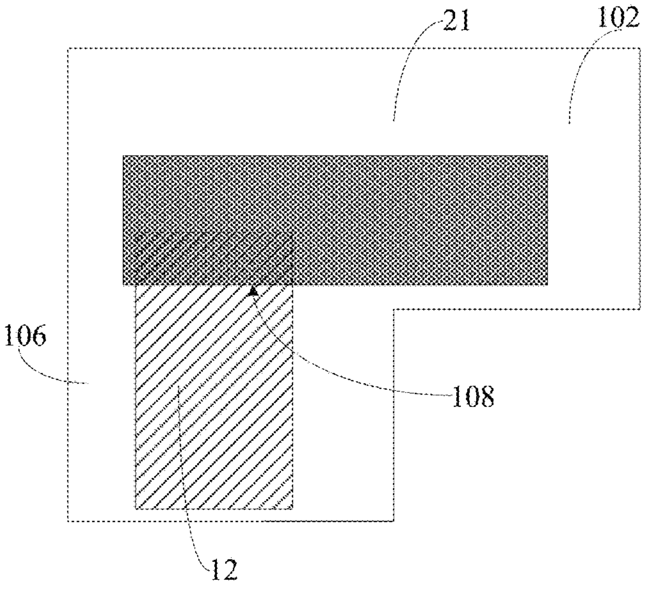
FIG. 7 is a partial schematic structure diagram of a display substrate according to an embodiment of the present disclosure.

In an embodiment, as shown in FIG. 7, the first light-shielding layer 10 includes a fourth light-shielding portion 12 in the second peripheral region 106, where the second light-shielding portion 21 is in direct contact with a part of the fourth light-shielding portion 12. An orthographic projection of the fourth light-shielding portion 12 on the first base 30 partially overlaps an orthographic projection of the second light-shielding portion 21, and a boundary 108 is between a region where the second light-shielding portion 21 and the fourth light-shielding portion 12 contact and a region where the fourth light-shielding portion 12 and the second light-shielding portion 21 do not contact. The total thickness of the second light-shielding portion 21 and the region where the second light-shielding portion 21 contacts the fourth light-shielding portion 12 is larger than the thickness of the region where the fourth light-shielding portion 12 and the second light-shielding portion 21 do not contact, so that a height difference is between the region where the second light-shielding portion 21 and the fourth light-shielding portion 12 contact and the region where the fourth light-shielding portion 12 and the second light-shielding portion 21 do not contact, and thus, a boundary 108 is between the region where the second light-shielding portion 21 and the fourth light-shielding portion 12 contact and the region where the fourth light-shielding portion 12 and the second light-shielding portion 21 do not contact. In some embodiments, the boundary 108 may be a straight line. In some embodiments, the boundary 108 extends along the first direction X.

In an embodiment, as shown in FIG. 6, the orthographic projection of the first light-shielding portion 11 on the first base 30 does not overlap the orthographic projection of the third light-shielding portion 22 on the first base 30. The edge of the third light-shielding portion 22 away from the display region 101 may extend beyond the edge 911 of the first polarizer 91 away from the display region 101, and may extend beyond the edge 921 of the second polarizer 92 away from the display region 101. In the display device including the display substrate, the light emitted by the backlight source cannot be incident on the region where the third light-shielding portion 22 disposed, or the light emitted by the backlight source cannot be incident on the region of the third light-shielding portion 22 beyond the first polarizer; alternatively, the housing of the display device may cover the region where the third light-shielding portion 22 is disposed, and the light emitted by the backlight source cannot be emitted out after being incident on the region of the third light-shielding portion 22 corresponding to the first polarizer and the second polarizer, thereby avoiding the region where the third light-shielding portion 22 is disposed to be bright.

In an embodiment, as shown in FIG. 5, the orthographic projection of the first light-shielding portion 11 on the first base 30 overlaps the orthographic projection of the third light-shielding portion 22 on the first base 30. The edge of the first light-shielding portion 11 away from the display region 101 is flush with the edge of the first base 30 away from the display region 101. At this case, the display substrate further includes an insulating portion outside the first light-shielding portion 11. The orthographic projection of the third light-shielding portion 22 on the first base 30 is covered by the orthographic projection of the first polarizer 91 on the first base 30 and is covered by the orthographic projection of the second polarizer 92 on the first base 30. With this arrangement, a transmission axis of the first polarizer 91 and a transmission axis of the second polarizer 92 are perpendicular to each other. In the display device including the display substrate, when the light emitted by the backlight source is incident on the region of the third light-shielding portion 22, after passing through the second polarizer 92, the light can pass through the second openings 221 of the third light-shielding portion 22 and be incident on the first polarizer 91 and be absorbed by the first polarizer 91, which can avoid that the first peripheral region 102 of the display substrate appears to be bright.

In an embodiment, the orthographic projection of the gap between the second light-shielding portion 21 and the third light-shielding portion 22 on the first base 30 is covered by the orthogonal projection of the first polarizer 91 on the first base 30 and covered by the orthographic projection of the second polarizer 92 on the first base 30. With this arrangement, the transmission axis of the first polarizer 91 and the transmission axis of the second polarizer 92 are perpendicular to each other. The incident light, from a side of the first substrate 110 away from the second substrate and passed through the second polarizer 92, may be incident on the first polarizer 91 through the gap and absorbed by the first polarizer 91, which can prevent the first peripheral region 101 of the display substrate from being bright, caused by the present of the gap between the second light-shielding portion 21 and the third light-shielding portion 22.

In an embodiment, as shown in FIG. 4, a side of the first light-shielding portion 11 in the first peripheral region 102 away from the display region 101 has a notch portion 113, and an orthographic projection of a part of an edge of the notch portion 113 adjacent to the display region 101 on the first base 30 is covered by an orthographic projection of the second light-shielding portion 21 on the first base 30. When manufacturing the first light-shielding layer, the inclination of the baffle may cause a notch portion 113 to be formed at a part of the first light-shielding portion 11 in the first peripheral region 102. By arranging the orthographic projection of a part of the edge of the notch portion 113 connected to the display region 101 on the first base 30 to be covered by the orthographic projection of the second light-shielding portion 21 on the first base 30, a region where the notch portion 113 in the first peripheral region 102 is disposed being bright can be avoided. In the embodiment shown in FIG. 4, a part of the region of the first light-shielding portion 11 adjacent to the notch portion 113 is covered by the second light-shielding portion 21. In other embodiments, the region of the first light-shielding portion 11 adjacent to the notch portion 113 may be entirely covered by the second light-shielding portion 21.

In an embodiment, as shown in FIG. 4, in a direction from the display region 101 to the first peripheral region 102, a dimension of a part of the first light-shielding portion 11 where the notch portion 113 is provided tapers in a direction perpendicular to the direction from the display region 101 to the first peripheral region 102. That is, in the direction from the display region 101 to the first peripheral region 102, the dimension of the notch portion 113 in the first direction X is gradually increase. In FIG. 4, the dimension of the notch portion 113 is exaggerated to better illustrate the notch portion 113, and in actual structure, the dimension of the notch portion 113 in the second direction Y is smaller than the dimension of the second light-shielding portion 12 in the second direction Y. In some embodiments, the dimension of the notch portion 113 in the second direction Y may range from 0.756 mm to 1.002 mm.

In an embodiment, at least some of the liquid crystal molecules of the liquid crystal layer 50 in the first peripheral region 102 contact the sealant 70; and the orthographic projection of the second light-shielding portion 21 on the first base 30 covers the orthographic projection of the at least some of the liquid crystal molecules on the first base 30.

In the process of manufacturing the display substrate, one of the sealant 70 and the liquid crystal layer 50 is disposed on the first substrate 110, and the other one of the sealant 70 and the liquid crystal layer 50 is disposed on the second substrate 120; and then the first substrate 110 and the second substrate 120 are aligned, so that the first substrate 110 and the second substrate 120 are bonded together through the sealant 70. Before the sealant is cured, some liquid crystal molecules contact the sealant 70. During the curing process of the sealant 70, the liquid crystal molecules in contact with the sealant are fixed. Even if an electric field is applied to these liquid crystal molecules, these liquid crystal molecules cannot be deflected. This part of the liquid crystal molecules may cause bright lines in the first peripheral region 102, affecting the user experience. By arranging the orthographic projection of the second light-shielding portion 21 on the first base 30 to cover the orthographic projection of the at least some of the liquid crystal molecules on the first base 30, the problem of bright lines in the first peripheral region 102 caused by the liquid crystal molecules being fixed by the sealant 70 can be solved.

In an embodiment, the orthographic projection of the edge of the sealant 70 toward the display region 101 on the first base 30 is covered by the orthographic projection of the second light-shielding portion 21 on the first base 30. This arrangement may ensure that the orthographic projection of the second light-shielding portion 21 on the first base 30 covers the orthographic projection of the liquid crystal molecules in contact with the sealant 70 on the first base 30. In the embodiment shown in FIG. 6, the region of the orthographic projection of the sealant 70 on the first base 30 partially overlaps the orthographic projection of the second light-shielding portion 21 on the first base 30. In other embodiments, only the orthographic projection of the sealant 70 on the first base 30 toward the edge of the display region 101 overlaps the orthographic projection of the second light-shielding portion 21 on the first base 30.

In an embodiment, in the direction from the display region 101 to the first peripheral region 102, that is, in the second direction Y, the dimension of the part of the orthographic projection of the designed position of the sealant 70 on the first base 30 overlapped the orthographic projection of the second light-shielding portion 21 on the first base 30 is greater than or equal to the deviation of the edge position of the sealant 70 in the second direction Y. With this arrangement, even if the deviation of the edge position of the sealant 70 in the second direction Y reaches the maximum during the manufacturing process, that the orthographic projection of the edge of the sealant 70 on the first base 30 toward the display region overlaps the orthographic projection of the second light-shielding portion 21 on the first base 30 may be ensured.

In some embodiments, in the second direction Y, the design value of the width of the sealant 70 is 1.8 mm, and the position deviation of two opposite edges of the sealant 70 is 0.215 mm, that is, a maximum width of the sealant 70 may reach 2.23 mm. The display substrate provided by the embodiment of the present disclosure is manufactured by using a mask for a large-dimension display substrate. The large-dimension display substrate requires that, in the second direction Y, the dimension of the second light-shielding portion 21 is greater than or equal to the dimension of the sealant 70. In the embodiment of the present disclosure, the dimension of the second light-shielding portion 21 in the second direction Y may be about 2.3 mm.

Figure 8:
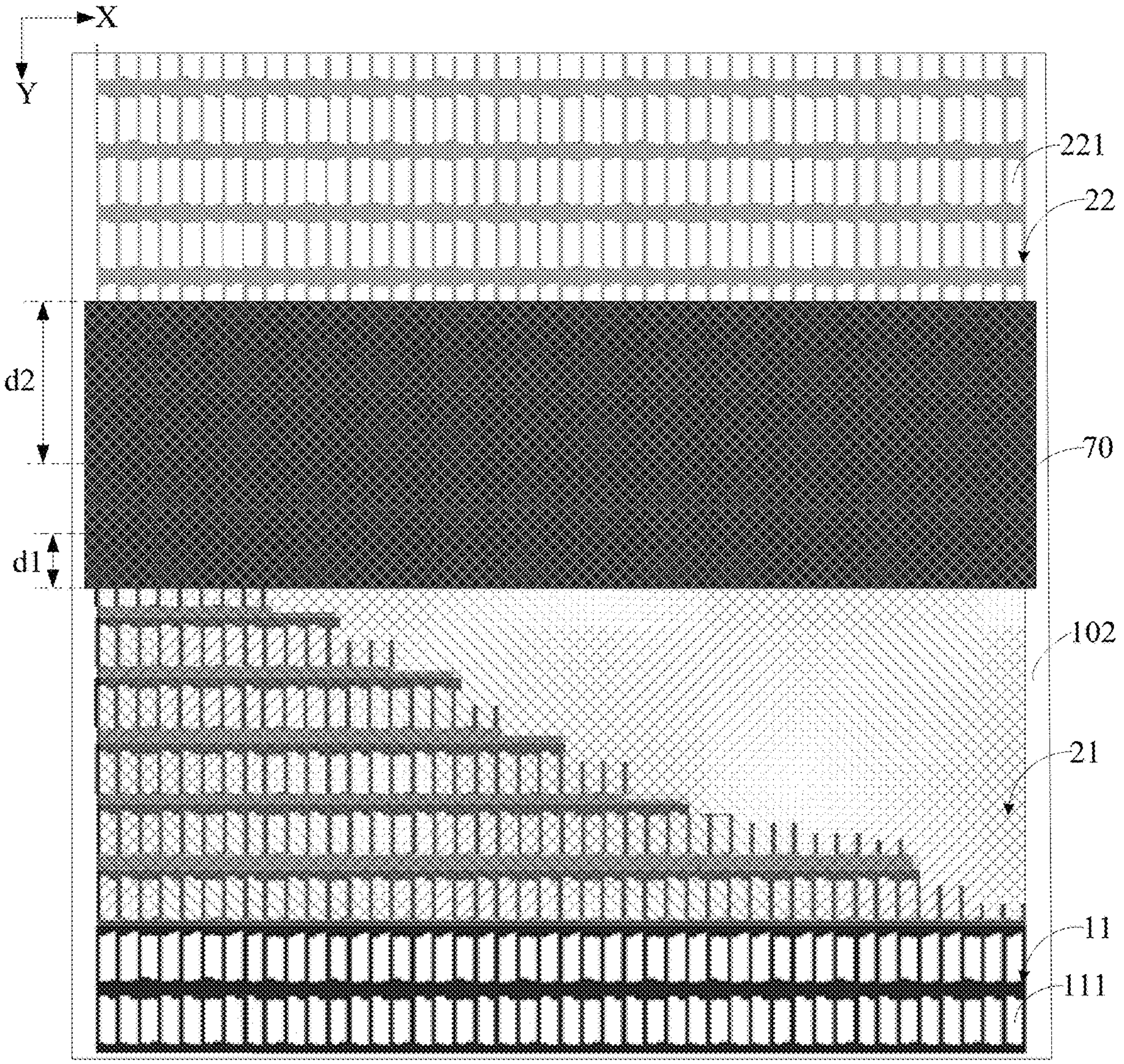
FIG. 8 is a partial schematic structure diagram of a first peripheral region of a display substrate according to another embodiment of the present disclosure.

In an embodiment, as shown in FIG. 8, the orthographic projection of the sealant 70 on the first base 30 overlaps the orthographic projection of the second light-shielding portion 21 on the first base 30, and the orthographic projection of the sealant 70 on the first base 30 overlaps the orthographic projection of the third light-shielding portion 22 on the first base 30.

Further, as shown in FIG. 8, in the direction from the display region 101 to the first peripheral region 102, that is, in the second direction Y, a dimension of an overlap between the orthographic projection of the sealant 70 on the first base 30 and the orthographic projection of the second light-shielding portion 21 on the first base 30 is a first dimension d1. A dimension of an overlap between the sealant 70 on the first base 30 and the orthographic projection of the third light-shielding portion 22 on the first base 30 is a second dimension d2. The first dimension d1 is smaller than the second dimension d2.

Further, the second dimension d2 may be larger than one-third of the first dimension d1. The second dimension d2 may be substantially the same as the dimension of the gap between the second light-shielding portion 21 and the third light-shielding portion 22 in the second direction Y. In some embodiments, the first dimension d2 is about 0.9 mm and the second dimension d2 is about 0.4 mm.

In an embodiment, as shown in FIGS. 4 and 5, a part of the first light-shielding portion 11 in the first peripheral region 102 includes a first light-shielding sub-portion 114 and a second light-shielding sub-portion 115 between the first light-shielding sub-portion 114 and the display region 101, and the display substrate further includes rows of first sub-pixels in the first peripheral region 102; where an orthographic projection of one of the first sub-pixels on the first base 30 is within an orthographic projection of one of the first openings in the second light-shielding sub-portion 115 on the first base 30; where at least part of an orthographic projection of the second light-shielding sub-portion 115 on the first base 30 is outside the orthographic projection of the second light-shielding portion 21 on the first base 30; where the first sub-pixels include liquid crystal molecules, and the long axis direction of each of the liquid crystal molecules of each of the first sub-pixels is perpendicular to a surface of the first base 30. Since the long axis direction of the liquid crystal molecules of the first sub-pixel is perpendicular to the surface of the first base 30, the light emitted by the backlight source at the side of the first substrate away from the second substrate cannot be emitted out through the first sub-pixels, that is, the region where the second light-shielding sub-portion 115 is located is in a dark state, which can avoid that the second light-shielding layer 20 covering the display region 101 due to errors in manufacturing the second light-shielding layer 20 and affecting the display effect of the display region 101. Even if the light-shielding portion covers the first sub-pixel, the dark state effect presented in the first peripheral region cannot be affected. The manufacturing precision of the second light-shielding portion is lower, which helps to reduce the difficulty of manufacturing the display substrate. In some embodiments, the long axis direction of the liquid crystal molecules of the first sub-pixel may be perpendicular to the surface of the first base 30 by controlling the electrical signal output by the pixel circuit to the pixel electrode of the first sub-pixel. In some embodiments, each row of the first sub-pixels includes first sub-pixels arranged along the first direction X. The display substrate may include, for example, six rows of the first sub-pixels.

Further, as shown in FIG. 4, the edge of the orthographic projection of the second light-shielding sub-portion 115 on the first base 30 away from the display region 101 may coincide with the edge of the orthographic projection of the second light-shielding portion 21 on the first base 30 toward the display region 101. With this arrangement, when the distance between the second light-shielding portion 21 and the third light-shielding portion 22 is constant, it can avoid the overlapped region of the orthographic projection of the second light-shielding sub-portion 115 on the first base 30 and the orthographic projection of the second light-shielding portion 21 on the first base 30 being too large, which may result in the third light-shielding portion 22 to be contacted with the first light-shielding portion 11 and the picture displayed in the display region of the display substrate to be green. In some embodiments, the dimension of the second light-shielding sub-portion 115 in the second direction Y may be about 2.2 mm.

In an embodiment, the orthographic projection of an end of the signal line connected to the pixel circuit corresponding to the first sub-pixel on the first base 30 is covered by the orthographic projection of the second light-shielding portion 21 on the first base 30. In this way, the second light-shielding portion 31 can prevent the end of the signal line covered by the second light-shielding portion 31 from reflecting light.

In an embodiment, the edge of the second light-shielding portion 21 facing the display region 101 overlaps the edge of the display region 101 facing the first peripheral region 102. In this embodiment, the first peripheral region 102 may not be provided with the first sub-pixel. In this way, this arrangement is helpful to reduce the width of the first peripheral region 102 and increase the area of the display region 101. In this embodiment, the manufacturing precision of the second light-shielding layer 20 is relatively high, and the second light-shielding layer 20 may not cover the display region 101.

Figure 9:
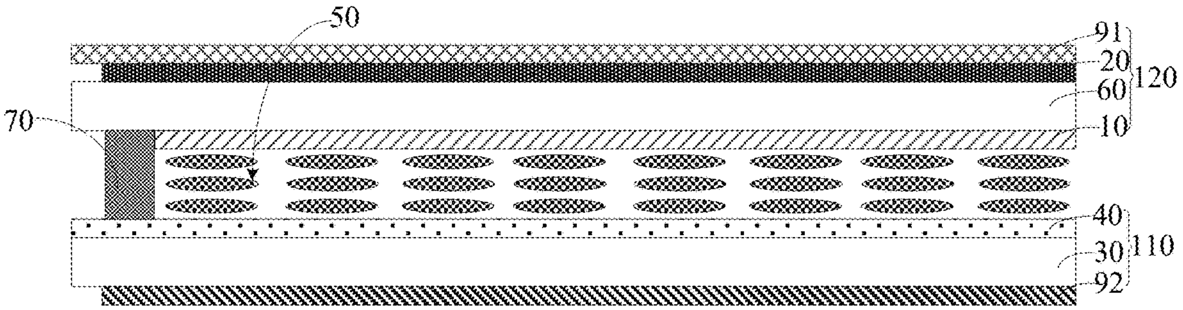
FIG. 9 is another cross-sectional view of the display substrate shown in FIG. 1 taken along the line AA.

In an embodiment, as shown in FIG. 9, the second light-shielding layer 20 is at a side of the second base 60 and away from the first substrate 110, and the first light-shielding layer 10 is closer to the first substrate 110 than the first light-shielding layer 10. The second light-shielding layer 20 may be formed by coating a light-shielding material. For example, the second light-shielding layer 20 may be formed by spraying tungsten powder.

Further, as shown in FIG. 9, the second light-shielding layer 20 is between the first polarizer 91 and the second base 60.

Furthermore, the thickness of the second light-shielding layer 20 is less than 1/10 of the thickness of the first light-shielding layer 10. The thickness of the second light-shielding layer 20 may be less than or equal to 10 μm, and the thickness of the first light-shielding layer 10 may be greater than 100 μm. The thickness of the bond layer between the first polarizer 91 and the second base 60 is about 200 μm. In this way, the second light-shielding layer 20 does not affect the attachment of the first polarizer 91 on the second base 60.

Figure 10:
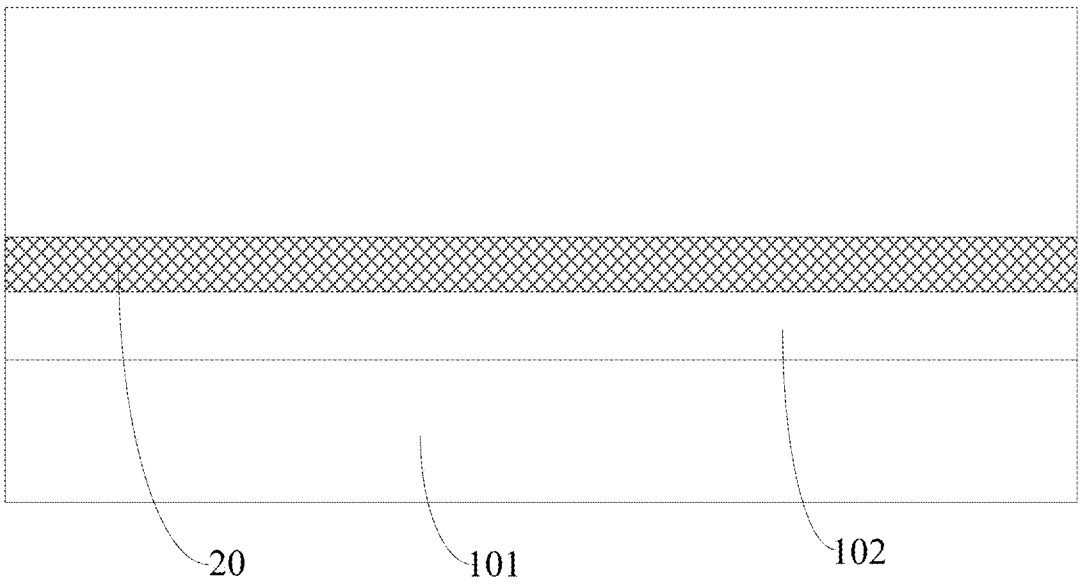
FIG. 10 is a partial enlarged diagram of a region B of a display substrate according to another embodiment of the present disclosure.

Further, as shown in FIG. 10, a gap is between the edge of the second light-shielding layer 20 facing the display region 101 and the display region 101.

Further, in the second direction Y, the width of the second light-shielding layer 20 may be greater than or equal to a sum of the maximum value of the process error between the designed position and the actual position of the edge of the sealant 70 and the dimension of the liquid crystal molecules in contact with the sealant 70. With this arrangement, even if the process error of the sealant 70 reaches the maximum value, the sealant 70 covering the liquid crystal molecules in contact with the sealant 70 can be ensured, thereby preventing the liquid crystal molecules in contact with the sealant 70 from causing a problem of bright lines in the first peripheral region 102. In some embodiments, in the second direction Y, the maximum value of the process error between the designed position and the actual position of the edge of the sealant 70 is 0.215 mm, and the dimension of the liquid crystal molecules contacted with the sealant 70 is 18.6 μm. The dimension of the second light-shielding layer 20 is greater than 0.44 mm.

In an embodiment, the driving circuit layer 40 includes a target signal line, and the target signal line is the same as the second light-shielding layer 20 in shape and area. With this arrangement, the second light-shielding layer 20 may be manufactured using the mask used for manufacturing the target signal lines, which helps to reduce the manufacturing cost.

In an embodiment, the target signal line is a gate signal line used to provide a gate driving signal to the pixel circuit. The second light-shielding layer 20 may be formed by using a strip-shaped opening in the edge region of the mask corresponding to the gate signal line.

Further, in the second direction Y, the dimension of the second light-shielding layer 20 is greater than the distance between the edge of the first light-shielding portion 11 away from the display region 101 and the edge of the first peripheral region 102 away from the display region 101. In this way, the orthographic projection of the second light-shielding layer 20 on the second base 60 overlaps the orthographic projection of the first light-shielding portion 11 on the second base 60. In this embodiment, an insulating portion needs to be provided around a periphery of the second light-shielding layer 20 to prevent the display region from becoming green. In some embodiments, in the second direction Y, the dimension of the second light-shielding layer 20 is 10.7 mm.

In this embodiment, a boundary is between a region of the second light-shielding layer in contact with the fourth light-shielding portion and a region of the fourth light-shielding portion not contacting the second light-shielding portion.

In another embodiment, the target signal line is a common voltage signal line or a ground signal line. The second light-shielding layer 20 can be formed by using a strip-shaped opening in the edge region of the mask corresponding to the common voltage signal line and the ground signal line.

Further, in the second direction Y, the dimension of the target signal line is less than the distance between the edge of the first light-shielding layer 20 away from the display region 101 and the edge of the first peripheral region 102 away from the display region 101. In this way, when the precision of the second light-shielding layer 20 is higher, the orthographic projection of the second light-shielding layer 20 on the second base 60 does not overlap the orthographic projection of the first light-shielding portion 11 on the second base 60. In some embodiments, in the second direction Y, the dimension of the target signal line may be 1.75 mm or 1.5 mm.

In this embodiment, a boundary is between a region of the second light-shielding layer in contact with the fourth light-shielding portion and a region of the fourth light-shielding portion not contacting the second light-shielding layer.

Figure 11:
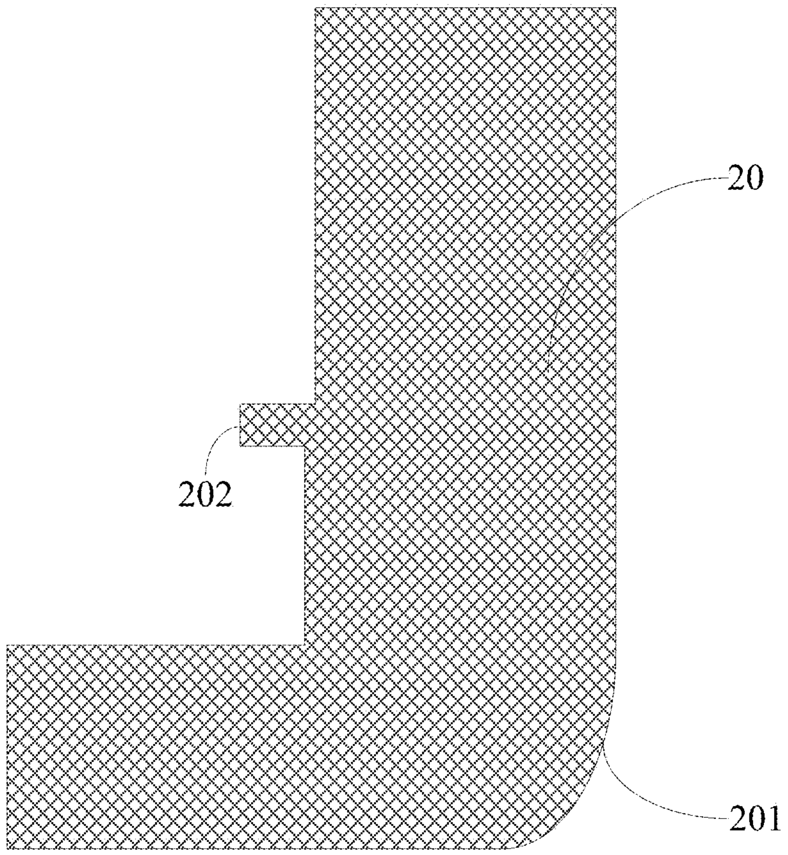
FIG. 11 is a partial schematic structure diagram of a second light-shielding layer of a display substrate according to another embodiment of the present disclosure.

FIG. 11 shows a partial schematic structure diagram of the second light-shielding layer 20. As shown in FIG. 11, the boundary of the second light-shielding layer is partially an arc and partially a fold line. The boundary is non-linear. The portion 201 of the boundary may be an arc, and the portion 202 of the boundary may be a fold line.

According to an embodiment of the present disclosure, a display device is provided. The display device includes the above-mentioned display substrate.

In an embodiment, the display substrate further includes a backlight source, and the backlight source is on a side of the first base and away from the second base.

In some embodiments, the display device further includes a housing, and the display substrate is embedded in the housing.

The display device provided in the embodiment of the present disclosure may be any appropriate display device, including but not limited to mobile phones, tablet computers, televisions, monitors, notebook computers, digital photo frames, navigators, e-books, and any other products or components with display functions.

It should be noted that in the accompanying drawings, the dimensions of the layers and the regions may be exaggerated for clarity of illustration. It will also be understood that when an element or a layer is referred to as being "on" another element or another layer, it can be directly on the another element, or an intermediate layer may be present. In addition, it will be understood that when an element or a layer is referred to as being "under" another element or another layer, it can be directly under the another element, or one or more intermediate layers or elements may be present. In addition, it will also be understood that when an element or a layer is referred to as being "between" two elements or two layers, it can be an only layer, or one or more intermediate layers or elements may be present. Similar reference numbers indicate similar elements throughout.

Other embodiments of the present disclosure will be readily apparent to those skilled in the art upon consideration of this description and practicing the content disclosed herein. The present disclosure is intended to cover any variations, uses, or adaptations of this disclosure which follow the general principles of the present disclosure and include common knowledge or customary technical means in this technical field that are not disclosed in the present disclosure. The specification and embodiments are considered as exemplary only, and the true scope and the spirit of the present disclosure is indicated by the following claims.

It is to be understood that the present disclosure is not limited to the precise structures described above and illustrated in the accompanying drawings, and various modifications and changes may be made without departing from the scope thereof. The scope of the present disclosure is limited only by the appended claims.

The invention claimed is:

1. A display substrate, comprising a display region, a first peripheral region on at least one side of the display region;

wherein the display substrate comprises a first substrate and a second substrate that are stacked;

wherein the first substrate comprises a first base and a driving circuit layer on the first base;

wherein the second substrate comprises a second base, a first light-shielding layer on the second base and a second light-shielding layer at a side of the second base;

wherein the first light-shielding layer comprises a first light-shielding portion in the display region and the first peripheral region, and the first light-shielding portion comprises first openings;

wherein the second light-shielding layer is in the first peripheral region, and the second light-shielding layer comprises a second light-shielding portion;

wherein the second light-shielding layer further comprises a third light-shielding portion at a side of the second light-shielding portion and away from the display region, and the third light-shielding portion comprises second openings; wherein a gap is between the second light-shielding portion and the third light-shielding portion.

2. The display substrate according to claim 1, wherein an orthographic projection of the second light-shielding portion on the first base overlaps an orthographic projection of the first light-shielding portion on the first base, and the second light-shielding portion is not provided with any openings.

3. The display substrate according to claim 2, wherein an orthographic projection of the third light-shielding portion on the first base does not overlap the orthographic projection of the first light-shielding portion on the first base.

4. The display substrate according to claim 3, wherein an edge of the third light-shielding portion away from the display region is flush with an edge of the first peripheral region away from the display region.

5. The display substrate according to claim 2, wherein the second light-shielding layer is closer to the first substrate than the first light-shielding layer, and the second light-shielding portion contacts the first light-shielding layer.

6. The display substrate according to claim 5, wherein the first light-shielding portion contacts the second light-shielding portion; wherein a total transmittance of a portion of the first light-shielding portion without the first openings and a part of the second light-shielding portion in contact with the portion is less than a transmittance of a part of the second light-shielding portion corresponding to the first openings.

7. The display substrate according to claim 2, wherein an orthographic projection of the third light-shielding portion on the first base partially overlaps the orthographic projection of a part of the first light-shielding portion away from the display region on the first base.

8. The display substrate according to claim 2, wherein an edge of the first light-shielding portion is flush with an edge of the first base; wherein the display substrate further comprises an insulating portion outside the first light-shielding portion;

wherein the second substrate further comprises a first polarizer on the second base and away from the first substrate, and the first substrate further comprises a second polarizer on the first base and away from the second substrate, wherein the insulating portion is between the first polarizer and the second polarizer;

wherein an orthographic projection of the third light-shielding portion on the first base is covered by an orthographic projection of the first polarizer on the first base, and is covered by an orthographic projection of the second polarizer on the first base.

9. The display substrate according to claim 2, wherein the second substrate further comprises a first polarizer on the second base and away from the first substrate, and the first substrate further comprises a second polarizer on the first base and away from the second substrate, wherein an orthographic projection of the gap on the first base is covered by an orthographic projection of the first polarizer on the first base, and is covered by an orthographic projection of the second polarizer on the first base.

10. The display substrate according to claim 2, wherein the first substrate comprises a liquid crystal layer;

wherein the display substrate further comprises a sealant between the first substrate and the second substrate, the sealant surrounds the liquid crystal layer, and the sealant is in the first peripheral region;

wherein an orthographic projection of the sealant on the first base overlaps the orthographic projection of the second light-shielding portion on the first base, and the orthographic projection of the sealant on the first base overlaps an orthographic projection of the third light-shielding portion on the first base;

wherein in a direction from the display region to the first peripheral region, a dimension of an overlap between the orthographic projection of the sealant on the first base and the orthographic projection of the second light-shielding portion on the first base is less than a dimension of an overlap between the orthographic projection of the sealant on the first base and the orthographic projection of the third light-shielding portion on the first base.

11. The display substrate according to claim 2, wherein in a direction from the display region to the first peripheral region, a dimension of the third light-shielding portion is larger than a dimension of the second light-shielding portion.

12. The display substrate according to claim 2, wherein one of the first openings is the same as one of the second openings in shape and area.

13. The display substrate according to claim 1, wherein the display substrate further comprises a second peripheral region adjacent to the first peripheral region, and the first light-shielding layer comprises a fourth light-shielding portion in the second peripheral region, wherein the second light-shielding portion is in direct contact with the fourth light-shielding portion, an orthographic projection of the fourth light-shielding portion on the first base partially overlaps an orthographic projection of the second light-shielding portion on the first base;

wherein a boundary is between a region where the second light-shielding portion and the fourth light-shielding portion contact and a region where the fourth light-shielding portion and the second light-shielding portion do not contact.

14. The display substrate according to claim 1, wherein a side of a part of the first light-shielding portion in the first peripheral region away from the display region has a notch portion, and an orthographic projection of a part of an edge of the notch portion adjacent to the display region on the first base is covered by an orthographic projection of the second light-shielding portion on the first base;

wherein in a direction from the display region to the first peripheral region, a dimension of a part of the first light-shielding portion where the notch portion is provided tapers in a direction perpendicular to the direction from the display region to the first peripheral region.

15. The display substrate according to claim 1, wherein the first substrate comprises a liquid crystal layer;

wherein the display substrate further comprises sealant between the first substrate and the second substrate, the liquid crystal layer is surrounded by the sealant, and the sealant is in the first peripheral region;

wherein at least one part of the liquid crystal layer in the first peripheral region contacts the sealant;

wherein orthographic projections of the at least one part of the liquid crystal layer on the first base are covered by an orthographic projection of the second light-shielding portion on the first base.

16. The display substrate according to claim 1, wherein a part of the first light-shielding portion in the first peripheral region comprises a first light-shielding sub-portion and a second light-shielding sub-portion between the first light-shielding sub-portion and the display region, and the display substrate further comprises rows of first sub-pixels in the first peripheral region;

wherein an orthographic projection of one of the first sub-pixels on the first base is within an orthographic projection of one of the first openings in the second light-shielding sub-portion on the first base;

wherein at least one part of an orthographic projection of the second light-shielding sub-portion on the first base is outside an orthographic projection of the second light-shielding portion on the first base.

17. The display substrate according to claim 1, wherein an edge of the second light-shielding portion facing the display region overlaps an edge of the display region facing the first peripheral region.

18. The display substrate according to claim 1, wherein the second light-shielding portion is on the second base and away from the first substrate, and the first light-shielding layer is on the second base and facing the first substrate;

wherein a thickness of the second light-shielding portion is less than 1/10 of a thickness of the first light-shielding layer;

wherein the second base further comprises a first polarizer on the second light-shielding layer and away from the first base, and an orthographic projection of the second light-shielding portion on the first base is covered by an orthographic projection of the first polarizer on the first base.

19. The display substrate according to claim 1, wherein the driving circuit layer comprises a target signal line, and the target signal line is the same as the second light-shielding layer in shape and area.

20. A display device, comprising the display substrate according to claim 1.

* * * * *